United States Patent [19]

Janssen

[11] Patent Number: 4,833,196

[45] Date of Patent: May 23, 1989

[54] PARTICULATE HYDROPEROXIDIZED POLY-N-VINYL LACTAM, ITS PREPARATION AND USE THEREOF

[75] Inventor: Robert A. Janssen, Alpharetta, Ga.

[73] Assignee: Ciba-Geigy Corporation, Ardsley, N.Y.

[21] Appl. No.: 233,554

[22] Filed: Jul. 25, 1988

Related U.S. Application Data

[62] Division of Ser. No. 015,818, Feb. 17, 1987, which is a division of Ser. No. 892,535, Aug. 4, 1985, Pat. No. 4,678,830.

[51] Int. Cl.$^4$ ................................. C08F 8/06
[52] U.S. Cl. ........................ 524/533; 524/548
[58] Field of Search ....................... 524/533, 548

[56] References Cited

U.S. PATENT DOCUMENTS

| | | | |
|---|---|---|---|
| 3,082,193 | 3/1963 | Mendelsohn | 525/326.9 |
| 3,412,020 | 11/1968 | Azorlosa | 525/326.9 |
| 3,437,647 | 4/1969 | Freifeld | 525/326.9 |
| 3,621,079 | 11/1971 | Leeds | 260/885 |
| 3,639,524 | 2/1972 | Selderman | 260/885 |
| 3,700,761 | 10/1972 | O'Driscoll et al. | 264/1 |
| 3,728,319 | 4/1973 | Kiesel et al. | 525/326.9 |
| 3,894,129 | 5/1975 | Hoffman et al. | 264/1 |
| 4,123,407 | 10/1978 | Gordon | 260/29.6 |
| 4,123,408 | 10/1978 | Gordon | 260/29.6 |
| 4,138,408 | 2/1979 | Witzlaff | 260/326 |
| 4,277,580 | 7/1981 | Allen et al. | 525/326.9 |
| 4,433,112 | 2/1984 | Straub et al. | 525/326.9 |
| 4,438,140 | 3/1984 | Guillon et al. | 525/326.9 |

FOREIGN PATENT DOCUMENTS

| | | |
|---|---|---|
| 2942657 | 4/1981 | Fed. Rep. of Germany . |
| 995283 | 6/1965 | United Kingdom . |
| 995880 | 6/1965 | United Kingdom . |

*Primary Examiner*—Joseph L. Schofer
*Assistant Examiner*—Bernard Lipman
*Attorney, Agent, or Firm*—Luther A. R. Hall

[57] ABSTRACT

Particulate hydroperoxidized poly-N-vinyl lactam containing an average of about 0.5 to 20 hydroperoxy mole equivalents per mole of poly-N-vinyl lactam, the preparation of the same by subjecting particulate poly-N-vinyl lactam to an effective amount of ozone, and the use thereof in the preparation of graft copolymers possessing a low degree of extractibles, finding utility in a wide number of fields, particularly in biomedical devices, semipermeable membranes, and as films or fibers.

1 Claim, No Drawings

PARTICULATE HYDROPEROXIDIZED POLY-N-VINYL LACTAM, ITS PREPARATION AND USE THEREOF

This is a divisional of application Ser. No. 015,818 filed on Feb. 17, 1987 still pending which is a divisional of application Ser. No. 892,535 filed on Aug. 4, 1985, now U.S. Pat. No. 4,678,838.

BACKGROUND OF THE INVENTION

1. Field of the Invention

The present invention relates to particulate hydroperoxidized poly-N-vinyl lactam, a method of preparing the same, and the use thereof in the preparation of graft copolymers with at least one hydrophobic monomer or hydrophilic monomer, and optionally a crosslinking agent. The resulting copolymers possess unexpectedly low extractibles and good mechanical properties and are useful in various biomedical applications, including contact lenses, medical surgical devices such as heart valves, vessel substitutes, mouth guards and denture liners, as semipermeable membranes, and as films or fibers, e.g. for textile uses or as burn and wound dressings.

2. Prior Art

Polyvinyl pyrrolidone and its use in the preparation of graft or block copolymers with hydroxyethyl methacrylate finding applications for a variety of purposes, including contact lenses, is described in U.S. Pat. No. 3,621,079.

U.S. Pat. No. 3,639,524 discloses the graft or block copolymerization of polyvinyl pyrrolidone with N-vinyl pyrrolidone and a monomeric methacrylate, optionally in the presence of a crosslinking agent and a catalyst, to prepare a crosslinked xerogel which can be machined into contact lens replicas and swollen in water to form a hydrated contact lens.

U.S. Pat. No. 3,894,129 discloses the graft or block copolymerization of polyvinyl lactams with a hydroxyalkyl methacrylate monomer in the presence of a polymerization initiator at low temperatures and containing not more than 0.7% alkyl glycol dimethyacrylate crosslinker, followed by a post polymerization heat treatment in the manufacture of contact lenses. This patent stresses the exclusion of oxygen from the polymerization reaction mixture on the grounds that oxygen inhibits polymerization and can cause uneven degrees of polymerization and monomer vaporization.

U.S. Pat. No. 4,138,408 discloses the graft or block copolymerization of a polyvinyl lactam with a mixture of hydrophilic and hydrophobic polymerizable monomers and a divinyl benzene or divinyltoluene crosslinking agent in the manufacture of contact lenses.

Unfortunately, due to the incomplete incorporation of polyvinyl lactam into the polymer network, such graft or block copolymers of the prior art, upon swelling with an aqueous medium, characteristically exhibit a relatively high degree of water soluble extractibles, comprising polyvinyl lactam containing residual products. Over a period of time, the mechanical properties of contact lenses made of such materials can degrade. Moreover, tinted lenses containing such extractibles can fade over an extended period of time.

It is thus an object of the present invention to provide an improved modified poly-N-vinyl lactams of increased reactivity with hydrophobic and hydrophilic monomers, and copolymers resulting therefrom.

It is a further object of the invention to provide crosslinked copolymers with a significantly reduced degree of extractibles.

These and other objects of the invention are apparent from the following disclosures.

SUMMARY OF THE INVENTION

According to one aspect of the present invention, there is provided particulate hydroperoxidized poly-N-vinyl lactam useful in the preparation of graft or block copolymers with hydrophilic and/or hydrophobic monomers. A further aspect of the present invention relates to copolymers prepared therefrom containing reduced water soluble extractibles as compared to non-hydroperoxidized poly-N-vinyl lactam derived copolymers. In a further aspect of the present invention there is provided a method of preparing such hydroperoxidized poly-N-vinyl lactams.

DETAILED DESCRIPTION OF THE INVENTION

One embodiment of the invention relates to a particulate hydroperoxidized derivative of a poly-N-vinyl lactam containing units of the formula

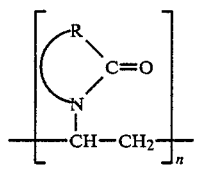

wherein
R is alkylene of 2 to 8 carbon atoms and n is between about 40 to about 4000, and mixtures thereof.

Generally, the polymers of formula I contain from 3 to 7 carbon atoms in the heterocyclic ring thereof, including the carbonyl carbon atom, and preferably contain from 4 to 6 such carbon atoms.

Some poly-N-vinyl lactams falling within the scope of formula I include, for example, poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, poly-N-vinyl-4,5-dimethyl-2-pyrrolidone, and the like.

Most preferred is polyvinylpyrrolidone.

The average value of n is preferably between about 50 and about 3600, most preferably between about 100 and about 800.

The starting material polymers according to formula I are known, per se, or can be prepared by methods well known in the art. For example, the corresponding N-vinyl lactam can be polymerized under moderate to elevated temperatures e.g. between about 20 to 160° C., optionally in the presence of a catalytic amount of a polymerization catalyst, such as azo-bis(isobutyronitrile), or a peroxide, such as hydrogen peroxide, di-tertiary butyl peroxide or t-butyl peroctoate, in the presence or absence of an inert diluent, such as water, and optionally in the further presence of a base, such as ammonia or amine, to inhibit hydrolysis and the like. As the artisan can appreciate, the reaction conditions can be adjusted to vary the degree of polymerization. Upon recovery of the polymer, it can be dried if necessary and comminuted, for example, powdered.

The particle size of the poly-N-vinyl lactam can vary widely, but conveniently possesses a particle size between about 0.01 and about 200 microns, preferably between about 0.1 and about 100 microns, and most preferably between about 0.5 and about 50 microns. Poly-N-vinyl lactams are widely available commercially. For example, polyvinyl pyrrolidone is generally commerically available over a wide average molecular weight range. Thus, the GAF Corporation supplies powdered polyvinyl pyrrolidone having an average molecular weight of about 10,000 (PVP K-15) to about 360,000 (PVP K-90). A convenient polyvinyl pyrrolidone of GAF Corporation is Plasdone C Grade having a number molecular weight of about 37,000 and a molecular weight range of about 25,000–50,000. Also convenient is PVP K-30, having an average molecular weight of about 40,000, supplied by GAF Corporation.

The hydroperoxidized poly-N-vinyl lactam of the present invention generally contains an average of between about 0.5 to about 20 hydroperoxy (—OOH) mole equivalents per mole of poly-N-vinyl lactam. Preferably the polymer contains an average of between about 1 to about 15 mole equivalents of hydroperoxy groups per mole of polymer, most preferably between about 1 to about 10 mole equivalent of hydroperoxy groups per mole of polymer.

In another embodiment of the invention, hydroperoxy groups can be conveniently introduced into the polymer by subjecting the particulate polymer according to formula I to ozone ($O_3$), for example, by simply intimately contacting the particulate polymer with an ozone containing gaseous carrier, such as ozonated air or ozonated oxygen, for a period of time sufficient to result in the requisite uptake of ozone into the polymer to form the desired hydroperoxidized polymer derivative. The reaction temperature is generally not critical, and the reaction can be conducted over a wide temperature range, e.g. between 0° and 100° C., preferably under ambient conditions.

In order to facilitate the reaction between the polymer and ozone to form the hydroperoxidized derivative, it may be desirable to insure that the ozonation is conducted in the presence of a small amount of moisture. Generally, the poly-N-vinyl lactam contains, under ambient conditions, sufficient adsorbed water, e.g. 5–9 weight percent in the case of polyvinyl pyrrolidone, to facilitate the hydroperoxidation. If desired, moisture can be added, for example by adjusting the humidity or moisture content of the carrier gas to between about 20 and about 90 percent of saturation.

Ordinarily ozone can conveniently be prepared in admixture with a carrier gas by passing an oxygen containing gas, such as air or oxygen, through a standard ozone generator. In the case of air, generally about 2% ozone by weight is produced; the case of pure oxygen gas, about 4% ozone by weight is characteristically produced.

As stated above, moisture may be introduced into the reaction mixture by controlling the humidity of the ozone containing gas. However, attempts to hydroperoxidize polyvinyl lactams in aqueous solutions are to be avoided, since under such conditions, the polyvinyl lactam is characteristically degraded into low molecular weight products, presumably due to chain scission.

The ozone containing gas may be contacted with the particulate polymer according to various methods, such as passing the gas over a shallow layer of the particulates, or through a packed column containing the polymer particulates, and preferably by passing the ozone containing gas through a fluidized bed of particulate polymer.

The resulting hydroperoxidized poly-N-vinyl lactam can be polymerized with at least one hydrophobic or hydrophilic monomer, or mixtures thereof, optionally in the presence of a crosslinking agent, to obtain graft copolymers possessing unexpectedly low amounts of extractibles coupled with good mechanical properties, and useful in a wide variety of applications, including contact lenses, medical surgical devices such as heart valves, vessel substitutes, mouth guards and dental liners, semipermeable membranes and films or fibers, e.g. for textile uses or as burn and wound dressings.

Suitable hydrophilic copolymerizable monomer include generally water soluble conventional vinyl monomers such as:

acrylates and methacrylates of the general structure

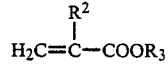

where $R_2$ is hydrogen or methyl and $R_3$ is hydrogen or is an aliphatic hydrocarbon group of up to about 10 carbon atoms substituted by one or more water solubilizing groups such as carboxy, hydroxy, amino, lower-alkylamino, di-lower-alkylamino, a polyethyleneoxide group with from 2 to about 100 repeating units, or substituted by one or more sulfate, phosphate, sulfonate, phosphonate, carboxamido, sulfonamido or phosphonamido groups, or mixtures thereof;

acylamides and methacrylamides of the formula

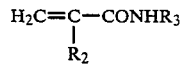

where $R_2$ and $R_3$ are as defined above;

acylamides and methacrylamides of the formula

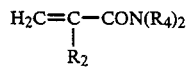

where $R_4$ is lower alkyl of 1 to 3 carbon atoms and $R_2$ is as defined above;

maleates and fumarates of the formula

wherein $R_3$ is as defined above;

vinyl ethers of the formula

where $R_3$ is as defined above;

aliphatic vinyl compounds of the formula

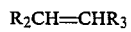

where $R_2$ is as defined above and $R_3$ is as defined above with the proviso that $R_3$ is other than hydrogen; and vinyl substituted heterocycles, such as vinyl pyridines, piperidines and imidazoles and N-vinyl lactams, such as N-vinyl-2-pyrrolidone.

Included among the useful water soluble monomers are:

2-hydroxyethyl-; 2- and 3-hydroxypropyl-; 2,3-dihydroxypropyl-; polyethoxyethyl-; and polyethoxypropyl-acrylates, methacrylates, acrylamides and methacrylamides;

acrylamide, methacrylamide, N-methyl acrylamide, N-methyl methacrylamide, N,N-dimethylacrylamide, N,N-demethyl methacrylamide;

N,N-dimethyl- and N,N-diethyl-aminoethyl acrylate and methacrylate and the corresponding acrylamides and methacrylamides;

2- and 4-vinylpyridine; 4- and 2-methyl-5-vinylpyridine; N-methyl-4-vinylpiperidine; 2-methyl-1-vinylimidazole; N,N-dimethyl allylamine; dimethylaminoethyl vinyl ether; N-vinylpyrrolidone;

acrylic and methacrylic acid; itaconic, crotonic, fumaric and maleic acids and the lower hydroxyalkyl mono-and diesters thereof, such as the 2-hydroxyethyl fumarate and maleate, sodium acrylate and methacrylate; maleic anhydride; 2-methacryloyloxyethylsulfonic acid and allylsulfonic acid.

Preferred water soluble monomers include 2-hydroxyethylmethacrylate, N,N-dimethylacrylamide, acrylic acid and methacrylic acid, and most preferably 2-hydroxyethylmethacrylate.

Suitable hydrophobic copolymerizable monomers include water insoluble conventional vinyl monomers such as:

acrylates and methacrylates of the general formula

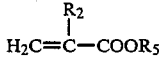

where $R_2$ is as defined above and $R_5$ is a straight chain or branched aliphatic, cycloaliphatic or aromatic group having up to 20 carbon atoms which is unsubstituted or substituted by one or more alkoxy, alkanoyloxy or alkyl of up to 12 carbon atoms, or by halo, especially chloro or preferably fluoro, or $C_3$-$C_5$ polyalkyleneoxy of 2 to about 100 units;

acrylamides and methacylamides of the general formula

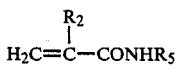

where $R_2$ and $R_5$ are defined above;
vinyl ethers of the formula

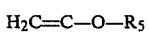

where $R_5$ is as defined above;
vinyl esters of the formula

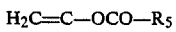

where $R_5$ is as defined above;
maleates and fumarates of the formula

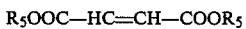

where $R_5$ is as defined above; and vinylic substituted hydrocarbons of the formula

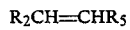

where $R_2$ and $R_5$ are as defined above.

Useful hydrophobic monomers include, for example:
methyl, ethyl, propyl, isopropyl, butyl, ethoxyethyl, methoxyethyl, ethoxypropyl, phenyl, benzyl, cyclohexyl, hexafluoroisopropyl or n-octyl-acrylates and -methacrylates as well as the corresponding acrylamides and methacrylamides;

dimethylfumarate, dimethylmaleate, diethylfumarate, methyl vinyl ether, ethoxyethyl vinyl ether, vinyl acetate, vinyl propionate, vinyl benzoate, acrylonitrile, sytrene, alphamethyl styrene, 1-hexene, vinyl chloride, vinyl methyl ketone, vinyl stearate, 2-hexene and 2-ethylhexyl methacrylate.

Generally, the copolymers are prepared by graft reacting a polymerizable mixture containing (a) from about 1 to about 80 weight percent of the hydroperoxidized poly-N-vinyl lactam, (b) optionally from about 0.1 to about 5 weight percent of a crosslinking agent, and (c) from about 99 to about 20 weight percent of one or more hydrophilic or hydrophobic monomers or mixtures thereof. If desired the reaction mixture may contain a catalytic amount of a conventional catalyst characteristically employed in polymerizing compounds having ethylenic unsaturation, and preferably a free radical catalyst. Of particular interest are conventional peroxide and azo catalysts, such as hydrogen peroxide, benzoyl peroxide, tert.butyl peroctoate, benzoyl peroxide or azobis(isobutylnitrile). In many cases, an initiator is not needed, due to the reactivity of the hydroperoxidized N-vinyl lactam. If desired or appropriate, the polymerization may be, at least in part, conducted in the presence of actinic radiation or the like, with or without the presence of a photoinitiator.

The graft polymerization can generally be carried out at temperatures between about 20° to about 150° C., for a period between about 1 to about 24 hours. It is understood that the time and temperature in such a reaction are inversely related. Thus, temperatures employed in the upper end of the temperature range will generally provide reaction times near the lower end of the time range.

Depending upon the nature of the polymer mixture, it may be desirable for the copolymers obtained from such polymerzations to be post cured, e.g. at a somewhat elevated temperature such as between about 60° 1 C. to about 150° C.

For the preparation of contact lenses, the polymer mixture may be cast directly in the shape of the lens, or the polymerization may be carried out in a mold having a shape convenient for further processing, such as in the shape of small cylinders or "buttons", which can then be machined.

In a preferred embodiment of the invention, at least 50 weight percent of the monomer (c) component is a hydrophilic monomer, preferably a mono ester of acrylic or methacylic acid and polyhydric alcohol, and most preferably hydroxyethyl methacrylate. Especially preferred are hydrophilic polymers capable of swelling in aqueous media to absorb between about 20% to about 80% water or other physiologically acceptable aqueous medium by weight, based upon the total hydrogel composition.

Suitable crosslinking agents are diolefinic monomers such as:

allyl acrylate and methacrylate; alkylene glycol and polyalkylene glycol di-acrylates and -methacrylates, such as ethylene glycol dimethyacrylate, and propylene glycol dimethyacrylate; trimethylol propane triacrylate; pentacrylthritol tetraacrylate, divinylbenzene; divinyl ether; divinyl sulfone;

bisphenol A diacrylate or methacrylate; methylene bisacrylamide; diallyl phthalate; triallyl melamine; and hexamethylene acrylate and methacrylate.

Of particular importance is the fact that the instant hydroperoxidized poly-N-vinyl lactam may be employed in conventional graft polymerization processes to produce useful articles of commerce in substantially the same manner as when employing poly-N-vinyl lactams, to obtain graft polymers quite similar in appearance to conventional poly-N-vinyl lactam graft polymers, but unexpectedly possessing unexpectedly low extractibles.

Accordingly, the hydroperoxidized particulate poly-N-vinyl lactam of the present invention may advantageously be employed in the preparation of graft copolymers as described in U.S. Pat. No. 3,621,079; U.S. Pat. No. 3,700,761; U.S. Pat. No. 4,123,407; and U.S. Pat. No. 4,123,408, for the uses described therein.

The following examples are presented for the purposes of illustration only and are not to be construed to limit the nature and scope of the instant invention. All parts are by weight unless otherwise disclosed.

EXAMPLE 1

27 grams of poly-N-vinyl pyrrolidone, containing about 2 to 3 percent by weight absorbed water, having a weight average molecular weight of about 40,000 (K-30 from GAF Corporation) and an average particle size of about 5 microns is placed in a 100 ml cylindrical fluidized bed containing a frit on the bottom through which ozonized oxygen gas, having a concentration of 6% ozone, prepared by passing $O_2$ through an ozone generator, is passed upwardly through the particulate poly-N-vinyl pyrrolidone at a rate of about 1 liter per minute gas for a period of 40 minutes at a temperature of about 18° C. The resulting poly-N-vinyl pyrrolidone is found to contain approximately 3 hydroperoxy mole equivalents per mole equivalent of poly-N-vinyl pyrrolidone.

EXAMPLE 2

As a comparative example, 18 grams of poly-N-vinyl pyrrolidone having a weight average molecular weight of about 40,000 (K-30 from GAF Corporation) is dissolved in about 204 grams of water, and ozonized oxygen gas, having a concentration of 4% ozone is passed through the solution at a rate of about 1 liter per minute of gas at a temperature of about 18° C. After about 1 minute the solution turned clear and degraded, as evidenced by a marked reduction in viscosity, illustrating scission of the poly-N-vinyl pyrrolidone under the reaction conditions.

EXAMPLE 3

2.0 grams of the peroxidized poly-N-vinyl pyrrolidone according to Example 1 is dissolved in a mixture of 9.3 grams hydroxyethyl methacrylate, 0.15 grams of ethyleneglycol dimethacrylate and 0.7 grams water, the solution is mixed to insure uniformity, degassed by placing the mixture in a vacuum, placed under a nitrogen blanket and subjected to ultraviolet radiation under ambient room temperature conditions. The solution polymerized withing 30 minutes to afford a clear crosslinked product suitable for use as a hydrophilic contact lens upon machining the product into a lens replica and swelling the machined lens replica with water.

EXAMPLE 4

In a manner identical to Example 3, 2.0 grams of the peroxidized poly-N-vinyl pyrrolidone is dissolved in 9.3 grams hydroxyethyl methacrylate and 0.7 grams water and the solution polymerized within 30 minutes to afford a clear polymerization product suitable for use as a hydrophilic contact lens material.

EXAMPLE 4

5.0 parts of ozonized poly-N-vinyl pyrrolidone prepared according to Example 1 is dissolved in a solution containing 19.5 parts hydroxethylmethacylate, 0.15 parts ethyleneglycol dimethacrylate, 0.05 parts benzoin methyl ether, 0.3 parts methacrylic acid and 1.2 parts water, degassed by subjecting the mixture to a vacuum, placed under a nitrogen blanket and poured into a contact lens replica mold. The solution in the mold is then subjected to ultraviolet radiation for two hours. The lens replica, upon equilibration with an isotonic saline solution, contains about 55.6% water and possessing superior clarity coupled with good mechanical properties. Upon subjecting a dried lens to exhaustive soxhlet extraction with methanol, only a 4.6% total loss of extractibles occurs. Similarly, upon subjecting a test lens prepared in accordance with the above to boiling water for a period of three days, only about a 3% reduction in weight, on a dry basis, occurs.

EXAMPLE 6

In order to show the increased reactivity of the instant ozonated poly-N-vinyl pyrollidone as compared with unaltered poly-N-vinyl pyrrolidone, two solutions are prepared. Solution A contains 2.0 grams of ozonized poly-N-vinyl pyrrolidone prepared in accordance with Example 1 dissolved in 8.0 grams hydroxyethyl methacrylate. Solution B contains 2.0 grams of non-ozonized poly-N-vinyl pyrrolidone, identical to the starting material of Example 1, dissolved in 8.0 grams of hydroxyethyl methacrylate. Both solutions are purged with nitrogen and subjected to ultraviolet light under identical conditions. Within 15 minutes, solution A polymerized whereas no evident polymerization occurred with solution B.

EXAMPLE 7

To further show the increased reactivity of the instant ozonized poly-N-vinyl pyrrolidone, solutions A and B were prepared according to Example 5. When solution A, containing 2.0 grams ozonated poly-N-vinyl pyrrolidone dissolved in 8.0 grams hydroxymethyl methacrylate, is heated to a temperature of 80° C. for a period of about 2 hours, the solution polymerizes into a hard polymeric mass. Solution B, containing non-ozonated poly-N-vinyl pyrrolidone, but otherwise identical, does not polymerize. This illustrates that ozonized poly-N-vinyl pyrrolidone auto-initiates polymerization in the absence of added catalyst or ultraviolet radiation.

What is claimed is:

1. A transparent contact lens formed of a hydrogel composition consisting essentially of (A) a graft copolymer, wherein said copolymer is formed from about 1 to about 80 weight percent of a particulate hydroperoxidized derivative of a poly-N-vinyl lactam containing units of the formula

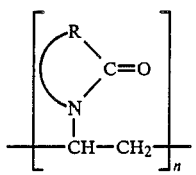

(I)

where R is alkylene of 2 to 8 carbon atoms, n is about 40 to about 4000, and wherein said derivative contains an average of between about 0.5 to about 20 hydroperoxy equivalents per mole of poly-N-vinyl lactam; said derivative being the result of the process comprising contacting a particulate polymer having units of formula I with ozone, from about 99 to about 20 weight percent of one or more hydrophilic or hydrophobic vinylic monomer, with the proviso that at least one-half of said vinylic monomer is a hydrophilic monomer, in the further presence or absence of up to about 5 weight percent of a crosslinking agent, and (B) swollen with a physiologically acceptable aqueous medium, such that the amount of (B) is between about 20 and 80 weight percent of the total of (A) and (B).

* * * * *

UNITED STATES PATENT AND TRADEMARK OFFICE
CERTIFICATE OF CORRECTION

PATENT NO. : 4,833,196

DATED : MAY 23, 1989

INVENTOR(S) : ROBERT A. JANSSEN

It is certified that error appears in the above-identified patent and that said Letters Patent is hereby corrected as shown below:

```
On the title page, Item [62], lines 2-3 should read
-- Aug. 4, 1986, Pat. No. 4,678,838 --.
```

Signed and Sealed this

Fourth Day of September, 1990

Attest:

HARRY F. MANBECK, JR.

*Attesting Officer*       *Commissioner of Patents and Trademarks*